UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

CEMENT COMPOSITION.

1,175,426.  Specification of Letters Patent.  Patented Mar. 14, 1916.

No Drawing.  Application filed November 25, 1913. Serial No. 803,04.

*To all whom it may concern:*

Be it known that I, WALTER K. FREEMAN, a citizen of the United States, residing at Oscawana, in the county of Westchester and State of New York, have invented certain new and useful Improvements in Plastic Compositions; and I do hereby declare the following to be a full, clear, and exact description of the invention, such as will enable other skilled in the art to make and use the same.

My invention relates to cement compounds, and it is the object of my invention to produce a cement compound useful for flooring and the like, and for making posts, cross-ties and other articles which are to be exposed to the action of earthy ingredients.

My new cement composition contains a substantial part of wood derivatives recovered from the sulfite waste of wood pulp mills, and I have found in practice that such a cement compound has peculiarly valuable properties for flooring. It has sufficient elasticity to make it pleasant to tread on, and it is fire-proof, and as compared with ordinary plaster "cement," it is more moisture-proof, lighter in weight, by far tougher and yet has the proper degree of hardness to withstand considerable wear.

In my co-pending application, Serial Number 803,043, filed on even date herewith, I have described a method of recovering from the sulfite waste liquor of wood pulp mills, the wood derivatives and also the sulfurous acid and calcium constituents in the form of substantially neutral inert substances, and I have used the word "xylium" to designate broadly the inert recovered product whether in a syrupy or anhydrous state. It was pointed out in that application that if the wood derivatives were to be recovered and separated from the sulfurous acid and calcium constituents of the liquor, the liquor was first treated with sodium chlorid and then treated with a suitable precipitant such as barium chlorid to effect precipitation of the sulfur and calcium compounds of the liquor, after which the syrupy mass containing the wood derivatives of the liquor was drawn off from the precipitate and then bleached if desired, and evaporated down to a solid mass and ground into powder. I termed this recovered substance containing the wood derivatives separated from the precipitates, whether in the syrupy or powdered state, "xylozo." It was also pointed out that if the wood derivatives and neutralized sulfurous acid and calcium ingredients were to remain unseparated in the neutralized mixture the mixture could be treated so as to effect precipitation of the sulfur calcium compounds, or it could be treated in such a way as to simply convert such compounds into inert substances suspended through the mass, as may be desired; and I termed this resulting mixture, whether in the syrupy or anhydrous state, "xylosca."

In this specification, I will use the terms "xylium" "xylosca" and "xylozo" in the sense stated, to designate the neutralized products recovered from the sulfite waste liquor.

In order that those skilled in the art may thoroughly understand my invention and the manner of carrying out the same, I will describe in detail the preferred method of making my new cement compound.

I first take disintegrated wood, or other suitable hard vegetable matter which has preferably been thoroughly dried, and I treat it with a solution of a suitable metal chlorid, preferably magnesium chlorid, of a strength of about 15° Baumé. The wood thus treated is then well mixed with powdered magnesium oxid to thoroughly coat all of the minute particles of the wood, after which the mixture is allowed to dry out to harden the mass. The hardened mass is then broken up, placed in a mill, and ground up with a suitable amount of dry "xylium"—*i. e.* the dry residua left when sulfite liquor, after treatment as above indicated, is evaporated to dryness—a dry metal oxid and chlorid, preferably magnesium oxid and chlorid, and a suitable amount of dry inert matter such as crushed marble, clean sand or the like, to form a dry disintegrated or powdered cement mixture. If desired, the disintegrated or ground wood may be mixed with powdered oxy-chlorid and wetted to harden it, and then ground up with the "xylium" and oxid and chlorid added in powdered form, or the hardened wood may be reduced to powdered form alone and then subsequently mixed with powdered "xylium" and powdered oxid and chlorid. Such slight changes in the method of mixing the different ingredients will not affect to any extent the resulting compound. The cement compound may then be shipped in suitable containers without the addition of the inert matter, which may be mixed in at the time the powdered composition is wetted for use. After the composition is mixed with the inert matter, and wetted with water or a solution of chlorid of a suitable metal, and worked to about the consistency of plaster, it may be laid with a trowel and allowed to set, the treatment being similar to that given commercial cement. After the cement compound has hardened, it may be drilled with tools without danger of cracking, and it is, therefore, obviously useful as a flooring for power plants, machine shops or factories where machines or other structures are to be erected and moved around from time to time.

I have found in practice that the proportions of the ingredients may be widely varied, depending upon the use for which the resulting flooring or article is intended but I will give below, by way of example, the proportions of the different ingredients which I have found in practice make a highly satisfactory floor covering for office buildings and public places: approximately 30 parts by weight of xylosca or xylozo, approximately 30 parts by weight of dry magnesium oxid, and approximately 15 parts by weight of dry magnesium chlorid, approximately 20 parts by weight of dry disintegrated wood which is to be hardened and disintegrated, and inert matter of from 50 to 250 parts by weight.

After this disclosure of my invention, it will be obvious to those skilled in the art that the proportion of the different ingredients may be widely varied without departing from my invention, the different proportions depending entirely upon the degree of toughness, elasticity or hardness desired; any suitable oxy-chlorid such as that of zinc, aluminum or barium, may be used in the place of the magnesium oxy-chlorid, or, if desired, compound oxy-chlorids in some instances may be used, and I do not wish to be limited to any particular proportion of the ingredients. It will also be obvious, after this disclosure of my invention, that in so far as the resulting composition flooring or article is concerned, it is not essential to my broad invention that the wood or vegetable matter be first thoroughly dried, since the disintegrated wood may be used with its normal per cent. of moisture, provided a more concentrated solution of the chlorid be used to compensate for the presence of this moisture. It is also immaterial to my broad invention that the wood be hardened before being ground up or mixed with the "xylium" and the oxychlorid; but where the wood or hard vegetable matter is used without being first thoroughly hardened, the moisture in the wood will evolve gases which greatly depreciate the quality of the resulting article, causing stains in the article and deterioration thereof. The presence of unhardened vegetable matter in the compound also renders it less moisture-proof and fire-proof and more readily affected by earthy ingredients, and by atmospheric conditions.

Having thus described my invention, what I claim as new and desire to secure by Letters Patent, is:

1. A dry powder for use in making cement compositions, containing cellulose liquor in which the sulfite compounds have been precipitated, said liquor and compounds having been dried and comminuted, with disintegrated wood, and the components of an oxy-chlorid cement.

2. A dry powder for use in making cement compositions, containing cellulose liquor in which the sulfite compounds have been precipitated, said liquor and compounds having been dried and comminuted, with disintegrated wood, and the components of an oxy-chlorid cement and a suitable quantity of mineral filler.

3. A dry cement composition consisting substantially of pulverized residua of sulfite liquor in which the sulfites have been precipitated and the whole dried and pulverized, finely disintegrated wood which has been previously treated with an oxy-chlorid cement, and with the components in powdered form of a suitable oxy-chlorid cement.

4. A dry cement composition consisting substantially of pulverized residua of sulfite liquor in which the sulfites have been precipitated and the whole dried and pulverized, finely disintegrated wood which has been previously treated with an oxy-chlorid cement, and with the components in powdered form of a suitable oxy-chlorid cement, and finely divided mineral filler.

5. A new composition of matter consisting of sulfite cellulose liquor from which the sulfites have been precipitated, and the whole, including the liquor and the precipitates, dried, hardened, pulverized, with the components of an oxy-chlorid cement, and disintegrated wood which has been mixed with the components of an oxy-chlorid cement, allowed to set and then disintegrated.

6. A new composition of matter consisting of sulfite cellulose liquor from which the sulfites have been precipitated, and the whole, including the liquor and the precipitates, dried, hardened, pulverized, with the components of an oxy-chlorid cement, and disintegrated wood which has been mixed with the components of an oxy-chlorid cement and inert mineral filler, allowed to set and then disintegrated.

In testimony whereof I affix my signature, in the presence of two subscribing witnesses.

WALTER K. FREEMAN.

Witnesses:
 JNO. S. GEORGE,
 CLARENCE W. HODGE.